United States Patent
Connors

(10) Patent No.: US 6,449,267 B1
(45) Date of Patent: Sep. 10, 2002

(54) METHOD AND APPARATUS FOR MEDIUM ACCESS CONTROL FROM INTEGRATED SERVICES PACKET-SWITCHED SATELLITE NETWORKS

(75) Inventor: Dennis P. Connors, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/318,227

(22) Filed: May 25, 1999

Related U.S. Application Data

(60) Provisional application No. 60/121,463, filed on Feb. 24, 1999.

(51) Int. Cl.[7] .................................................. H04Q 7/20
(52) U.S. Cl. ....................... 370/347; 370/321; 370/437; 370/468; 455/450
(58) Field of Search ................................ 370/321, 322, 370/347, 348, 437, 468; 455/450–453, 509

(56) References Cited

U.S. PATENT DOCUMENTS

| | | | |
|---|---|---|---|
| 5,172,375 A | * 12/1992 | Kou | 370/322 |
| 5,572,517 A | * 11/1996 | Safadi | 370/431 |
| 5,638,371 A | * 6/1997 | Raychaudhuri et al. | 370/310.2 |
| 5,689,568 A | * 11/1997 | Laborde | 370/314 |
| 6,175,557 B1 | * 1/2001 | Diachina et al. | 340/7.43 |
| 6,192,026 B1 | * 2/2001 | Pollack et al. | 370/203 |
| 6,230,152 B1 | * 5/2001 | Barone | 370/230 |
| 6,347,085 B2 | * 2/2002 | Kelly | 370/352 |

* cited by examiner

Primary Examiner—William Trost
Assistant Examiner—Simon Nguyen
(74) Attorney, Agent, or Firm—V. D. Duraiswamy; M. W. Sales

(57) ABSTRACT

A method, apparatus, article of manufacture, and a memory structure for communicating data from a first node to a second node has been described. The method comprises the steps of receiving input data at the first node, transmitting a resource request having a resource metric from the first node to an allocating agent, receiving an allocation of resource units according to the resource metric, the resource units comprising at least one DAMA channel resource metric and at least one RA channel resource unit, queuing the input data into the DAMA channel buffer, dequeuing input data from the DAMA channel buffer into the RA channel buffer according to a comparison between a predicted transmission delay and a delay threshold, and transmitting the dequeued input data in the RA channel buffer via the RA resource units. The article of manufacture comprises a data storage device tangibly embodying instructions to perform the method steps described above. The apparatus comprises a receiver for receiving input data, a DAMA channel buffer for accepting the input data, a resource unit request module, operatively coupled to the transmitter and the receiver, the resource unit request module for generating a resource request metric when indicated by an information rate of the input data, and for receiving an allocation of resource units via the receiver, and a channel selection module, for dequeuing input data from the DAMA channel buffer to an RA channel buffer according to a predicted channel delay and a delay threshold.

23 Claims, 11 Drawing Sheets

```
tdma_frame_start()
{
    compute:
        $d_{max}^{DAMA}$ $d_{max}^{RA}$ while ( $d_{max}^{DAMA}$ > $D_T$ && $d^{RA}$ < $d_{max}^{DAMA}$ )
    {
        deque_n1_packet(queue = DQ, position = head)
        enque_n1_packet(queue = RAQ, position = tail)
        compute:
            $d_{max}^{DAMA}$ $d_{max}^{RA}$
    }
}
```

*FIG. 9*

METHOD AND APPARATUS FOR MEDIUM ACCESS CONTROL FROM INTEGRATED SERVICES PACKET-SWITCHED SATELLITE NETWORKS

CROSS-REFERENCE TO RELATED APPLICATIONS

This application claims benefit of U.S. Provisional Application No. 60/121,463 filed Feb. 24, 1999, by Dennis Connors, Bo Ryu, and Son Dao, and entitled "A QUALITY OF SERVICE BASED MEDIUM ACCESS CONTROL PROTOCOL," which application is hereby incorporated by reference herein.

BACKGROUND OF THE INVENTION

1. Field of the Invention

The present invention relates to systems and methods of communicating information in packet-switched networks, and in particular to a method and system for communicating uplink data packets from an earth station to a satellite while minimizing transport delay.

2. Description of the Related Art

Satellite networks have become a popular means to disseminate information over a wide area Transception of data over satellite networks must comply with certain access protocols that are suitable for the type of data to be transmitted. The access protocol determines how channel bandwidth will be allocated among system users. One such access protocol is the medium access control (MAC) protocol. In the past, the dominant media form transmitted over such networks has been computer data. However, in recent years, there has been a need to provide interactive, real-time multimedia such as medium quality interactive video over such networks. To provide such information, the underlying networks must be capable of delivering communication services complying with a specified Quality of Service (QoS) criteria. At the MAC sub-layer, this QoS amounts to some statistical guarantees on packet delay, delay variance, and loss.

In satellite networks, MAC protocols must be applied to the uplink (earth terminal to satellite) channel. Since the uplink is shared between many users and is hence a shared channel, the MAC protocol can have a significant effect on the QoS the network is capable of delivering. In designing a MAC for bursty variable bit-rate (VBR) sources in a high latency system, there is a tradeoff between uplink utilization and achievable delay. For instance, a MAC protocol technique that delivers a high link utilization (and thus a high network capacity) will almost always produce poor packet delays. This is because the instantaneous bandwidth requirements of each node (earth terminal) must be determined in order to perform an optimal allocation of network resources. This can lead to excessive transmission delays. This is particularly so when used with high latency systems such as satellite networks operating in geosynchronous orbit (GEO). In GEO satellite systems, the distance between the ground station and the satellites itself is a significant source of data latency.

Currently, individuals can purchase a relatively small satellite dish capable of two-way communication with a GEO satellite. These can be used by individual households, companies, universities, and many other "users" who do not have access to a broadband wired infiastructure. This "personal earth terminal" model raises the specter of many low bit-rate terminals sharing a common uplink channel. Because there are many personal terminals, there are potentially few sources being aggregated at the uplink point. This can lead to source traffic that is highly bursty, which presents problems in efficient MAC protocol design.

There are several methods for gaining channel access in a shared channel system. These methods vary from random access (RA) to fixed bandwidth allocation (FBA) protocols. The QoS that these techniques can deliver varies as well. The simplest form of random access is an access protocol wherein the remote users (in this case, earth terminals) transmit packets in an uncoordinated manner. Since collision-free channel resources cannot be guaranteed with RA methods, QoS guarantees, in terms of packet loss and delay, are very weak. However, such random, uncoordinated transmission protocols do offer reduced control signaling and algorithmic overhead, and in ease of implementation. Random access MAC protocols are traditionally employed when the network traffic is unpredictable and bursty.

With fixed bandwidth allocation (FBA) protocols, medium access is accomplished when the connection is set up. A terminal acquires a fixed amount of channel resources and maintains this resource for the life of the connection. The only time the amount of channel resource may change is when the connection is preempted by another connection with higher priority. FBA protocols are capable of delivering much stronger QoS guarantees than RA protocols. However, this QoS improvement comes at the expense of system capacity. For example, in cases where the source has a varying bit-rate (VBR), simply acquiring channel bandwidth greater than or equal to its peak rate will provide a relatively firm upper bound on the delays of packets entering the network. However, since the source is VBR, uplink channel resources will be wasted when the source is producing packets at a rate less than the peak rate. This poor link utilization leads to low network capacity (i.e. the number of terminals that can be supported within a given amount of uplink bandwidth).

FIG. 1 is a diagram showing the operation of a communication system using a demand assigned multiple access (DAMA) protocol. DAMA techniques, which address the capacity issue by using instantaneous bandwidth demands to statistically multiplex many VBR sources on one channel, can be used to deliver predictable delays without the poor capacity of FBA DAMA based MAC protocols comprise two primary elements: (1) a bandwidth request mechanism and (2) a mechanism for coordinated transmission. The bandwidth request mechanism normally consists of dedicated bandwidth for each terminal such as earth station 104 residing in a "request phase." The transmission of data packets occurs in the "data phase". The separation of these two phases is accomplished by a physical layer (PHY) protocol such as frequency division multiple access (FDMA), time division multiple access (TDMA), or code division multiple access (CDMA). In the request phase, data bandwidth is reserved by the earth station (ES) by a resource request module 116 forming and transmitting a resource requesting having a resource metric that represents the current value of the earth station's 104 desired bandwidth. This resource request phase allows the ES to communicate their instantaneous bandwidth needs to an allocating agent (AA) 108, which performs bandwidth allocation. In a satellite network 100, the AA 108 resides either at the satellite (denoted 108A) or at a terrestrial master control station (MCS) 106 (denoted 108B). Once the AA 108 has received the bandwidth requests of all terminals and earth stations 104, it decides how much channel resources (or resource units) to allocate to each terminal using an allocation algorithm (AAlg). Each earth station 104 is then informed, via a downlink channel, how many resource units (allocated frequencies in FDMA, time slot in CDMA, and codes in CDMA) it will receive and when to begin transmission. By informing each terminal when to transmit, the AA accomplishes coordinated transmission. This MAC scheme results in a system wherein the time varying bandwidth needs of any terminal can be accommodated. The only time insufficient bandwidth is allocated is when several stations 104 are producing traffic at close to their peak rates. When this occurs, some terminals may not get all of the channel bandwidth they requested. Because of this possibility, the QoS guarantees, in terms of delay bounds, are not as firm as the fixed bandwidth allocation case.

There are two main drawbacks to DAMA techniques, however. They are (1) bandwidth loss due to request signaling (2) and increased packet delay times. In a pure DAMA protocol, each data packet must wait a round trip time (i.e. twice the time required to transmit a packet between the earth station 104 and the allocating agent 108A at the satellite) before it can begin transmission. Due to the high delay (latency) in satellite networks (particularly those in GEO), the process of passing DAMA request information between an earth terminal and the satellite can be very time consuming. For example, for GEO systems, the delay in a transmission from an earth terminal to a satellite (hop delay D) is on the order of 135 milliseconds. If the AA 108 is located at the satellite, the time between a packet's arrival at the terminal output queue and its actual start of transmission on the uplink channel is lower bounded by 2D. If the AA is located at the terrestrial MCS 106, this time is now lower bounded by 4D. Hence, the link utilization benefits of DAMA bring with it a substantial increase in end-to-end delay, which can substantially reduce performance. Bandwidth is expended in transmitting the DAMA request metric. For instance, in a TDMA system the request metric is traditionally transmitted in a dedicated "mini-slot" at each TDMA frame. The frequency of this signaling must be kept high in order to minimize packet delay. This leads to a non-negligible amount of bandwidth that is lost to DAMA control. Hence, there are drawbacks associated with the foregoing pure-DAMA techniques.

These drawbacks are addressed in hybrid DAMA techniques. Hybrid DAMA improves on the delay performance of pure DAMA, without sacrificing the channel utilization benefits. Hybrid DAMA medium access schemes are MAC protocols in which a portion of the bandwidth is allocated in a demand assigned manner.

As described above, packets crossing DAMA systems capable of on-board satellite 102 switching will wait in the output queue of the earth terminal a minimum of 2D. This implies that the time to cross the satellite 102 portion of the end-to-end path is lower bounded by 4D. Therefore this 4D delay is the mark by which hybrids of DAMA must be measured. When considering real-time sources (such as source coded video), this 4D lower bound, (which is approximately 540 milliseconds for GEO satellite systems 100) can prove to be prohibitive in providing suitable QoS.

Suppose source coded VBR video defines a sustained data stream. In such cases, the video source has an average bit rate and the instantaneous bit rate deviates about this average. However, the bit rate never drops to zero. Recognizing this, hybrid DAMA MACs have been proposed.

Let $B_T$ represent the total uplink bandwidth and NET be the number of earth terminals with ongoing sustained stream connections. In the hybrid DAMA protocol, each earth station 104 is allocated a fixed number of resource units (i.e., in TDMA, slots) $\rho^{fx}$ in every TDMA uplink frame. The bandwidth that remains, $B-N_{ET}\cdot\rho^{fx}$ is made available on a demand assigned basis. In each TDMA frame, control slots are set aside for each earth terminal to transmit its output queue size. Using this information, the AA at the satellite 108A assigns the remaining $B-N_{ET}\cdot\rho^{fx}$ bandwidth. This technique can be thought of as a hybrid fixed bandwidth allocation and demand assigned multiple access or FBA/DAMA. This scheme seeks to exploit the fact that the bit rate of a sustained stream never drops to zero. Under certain loading conditions, this FBA/DAMA technique out performs DAMA and FBA.

However, there are two drawbacks to the FBA/DAMA technique. First, continually measuring and sending the output queue size every TDMA frame requires constant processing at both the satellite 102 and the earth station 104. Transmitting this queue size metric each frame in mini-slots wastes uplink bandwidth. Second, and more importantly, the DAMA part of this technique attempts to track the instantaneous queue size, which changes rapidly.

FIG. 2 is a control system 200 that illustrates the demand assigned multiple access protocol. The difference between the requested resource units 202 (representing the output queue) and the allocated resource units 208 provides an error signal, which becomes the DAMA request 204. The request 204 is delayed by a delay element 206 representing transmission delays before receipt by the allocating agent 108A and delayed again by another delay element 206 before the resource unit allocation 208 is received at the earth station 104. In a satellite network 100 of GEO satellites 102, the loop delay is 2D, which renders the tracking of the instantaneous queue size inaccurate.

There is therefore a need for a medium access control protocol that allows transmission of information with minimal delay, while simultaneously maximizing resource unit utilization. The present invention satisfies that need.

SUMMARY OF THE INVENTION

To address the requirements described above, the present invention discloses a method, apparatus, and an article of manufacture for communicating data from a first node to a second node. The method comprises the steps of receiving input data at the first node, transmitting a resource request having a resource metric from the first node to an allocating agent, receiving an allocation of resource units according to the resource metric, the resource units comprising at least one DAMA channel resource metric and at least one RA channel resource unit, queuing the input data into the DAMA channel buffer, dequeuing input data from the DAMA channel buffer into the RA channel buffer according to a comparison between a predicted transmission delay and a delay threshold, and transmitting the dequeued input data in the RA channel buffer via the RA resource units. The article of manufacture comprises a data storage device tangibly embodying instructions to perform the method steps described above.

The apparatus comprises a receiver for receiving input data, a DAMA channel buffer for accepting the input data, a resource unit request module, operatively coupled to the transmitter and the receiver, the resource unit request module for generating a resource request metric when indicated by an information rate of the input data, and for receiving an allocation of resource units via the receiver, and a channel selection module, for dequeuing input data from the DAMA channel buffer to an RA channel buffer according to a predicted channel delay and a delay threshold.

The MAC protocol described herein is of the demand assigned multiple access (DAMA) family. The disclosed protocol uses a DAMA request metric which attempts to measure the slow time behavior of source coded video. This request metric is used with a channel that is both random access (RA) and DAMA, and describes a MAC protocol which solves the delay/capacity trade-off by introducing slight packet loss that can be tolerated by most real-time multimedia applications (voice and video).

For example, the MAC protocol described herein can be advantageously used with video conferencing tools running over an Internet MBone. The Mbone is a virtual network running over the physical Internet, which serves as a testbed for delivering multimedia services to many users via IP multicast. Currently, the Internet provides only best effort delivery of packets which provides no QoS guarantee. This causes current real-time MBone applications to see heavy packet loss under certain congestion conditions. We will define at this point medium quality video to be interactive applications, which produce traffic at average rates less than 500 kb/s and can tolerate packet loss of 5 percent or less. This definition describes most interactive applications currently using the MBone.

BRIEF DESCRIPTION OF THE DRAWINGS

Referring now to the drawings in which like reference numbers represent corresponding parts throughout:

FIG. 9 is a diagram showing a pseudo code for implementing the dequeuing of data from the DAMA queue to the RA queue;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Source coded video (such as MPEG-coded video) can be modeled as a slow time process (STP) modulating a fast time process (FTP). The STP can be described in terms of a parameter describing the mean information rate of a particular scene in a video sequence. STPs change on an order slower than 2D, while the FTPs (which represent the variability of each video frame) behave like an oscillation about the STP.

The present invention advantageously uses the slow time/fast time behavior of the STP and FTP to create a hybrid random access/demand assigned multiple access (RA/DAMA) protocol. The present invention tracks the STP and uses the tracked value for the request metric. This allows a slow time-changing amount of DAMA bandwidth to be allocated to each terminal that follows the slow time behavior of each source. The signaling required for this DAMA bandwidth occurs at the rate that the STP changes, rather than the TMDA frame size. This results in a reduction in the amount of bandwidth required for DAMA signaling.

In order to monitor the STP, an estimate of the instantaneous bit rate is determined. This computation is typically performed over a time window. During this time window, the video source could potentially go through a scene change. This result is reflected in a jump in the STP to a new value. If the scene change is in the direction of increasing bit rate, packets will begin to accumulate at the earth station 104 output queue.

Since a certain amount of time is required to form an estimate of the new STP value and a round trip time is needed to have this acknowledged by the allocating agent 108A in the satellite 102, packets produced during this time may see unacceptable end-to-end delays. To address this problem, the present invention makes the unused portion of the uplink TDMA frame available for transmission across a random access channel. Since packets use the random channel only during scene changes, collisions on the RA channel only occur if scene changes occur simultaneously in independent uplink video sessions. Since this probability is relatively low, then packet loss rates are low as well.

Figure 3:
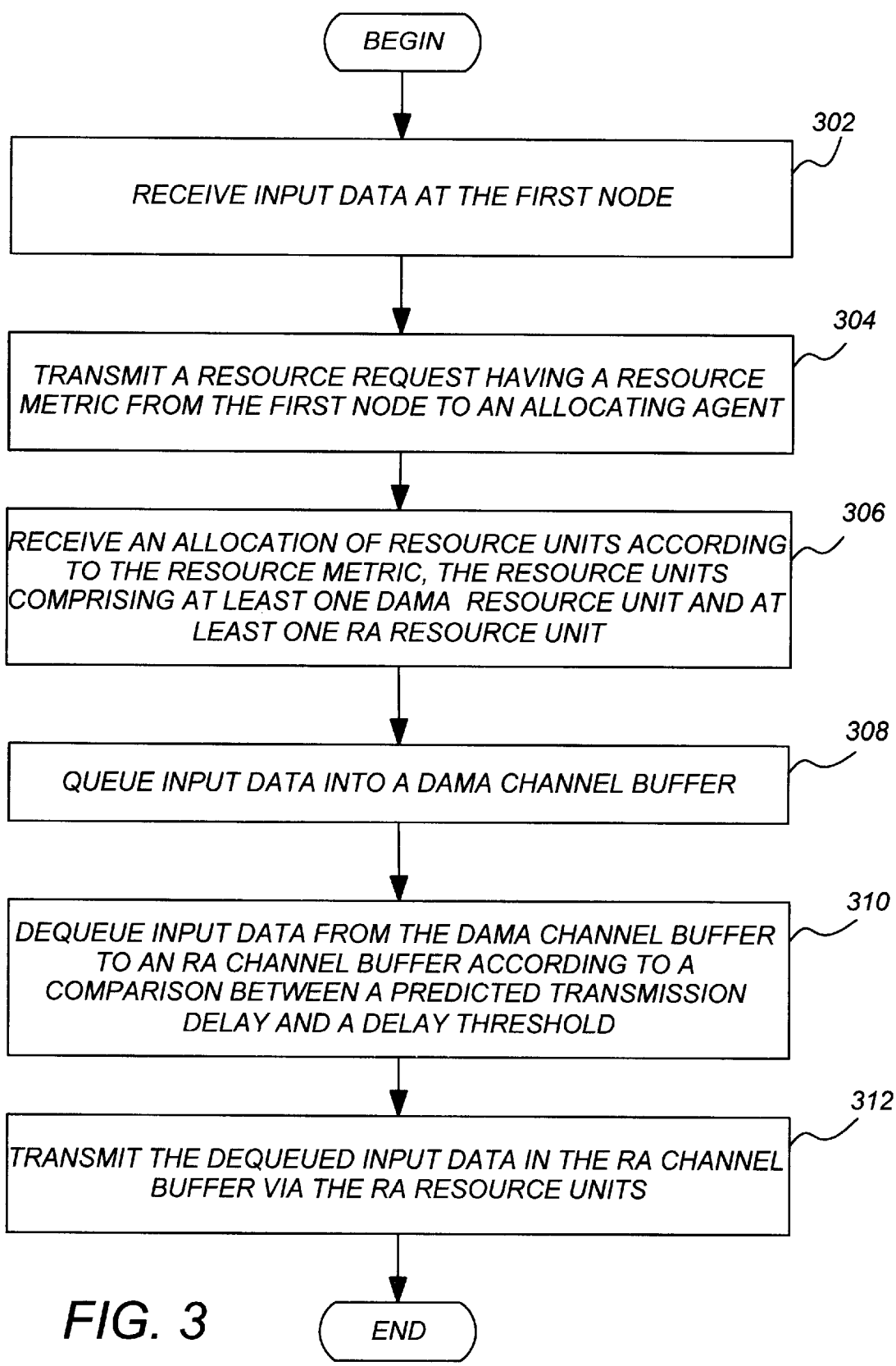
FIG. 3 is a flow chart presenting exemplary process steps used to practice the present invention.

FIG. 3 is a flow chart presenting exemplary process steps used to practice the present invention. Input data is received at a first node 112 such as the earth station 104 having a receiver 118, as shown in block 302. Generally, this input data is continuously received by the first node, and is queued into a channel buffer for later transmission as described below. A resource request having a resource metric is transmitted from the first node 112 to an allocation agent 108, as shown in block 304. As will be described in further detail below, the resource metric is a function of the information rate of the input data received at the first node 112. Further, the input data is analyzed to determine when the resource request is transmitted.

The allocation agent 108 may be implemented in the first node 114 or another node. Where the allocation agent 108 is implemented in another node, the resource request is forwarded to the node by first node 114.

The allocation agent uses the resource metric to allocate resource units to the first node 112, and transmits that allocation to the first node 112. The allocation includes at least one DAMA resource unit and at least one RA resource unit. The physical meaning of "resource units" depends on the communication link implementation. For example, where the communication link implements a TDMA allocation scheme, the resource units are comprised of time slots. Where FDMA is utilized, the resource units are frequency band allocations. Similarly, where CDMA is utilized in the communications line, the resource units are channel codes.

The allocation of the resource units can be transmitted to the first node 112 in several different ways. In one embodiment, the an allocation of resource units are transmitted to each node 112 via individually directed messages. In this case, each node receives an allocation of DAMA resource units, and an indication as to where the RA resource unit region begins. In a second embodiment, the allocation of DAMA resource units assigned to each node 112 is broadcast to all nodes in a single message. Each node is therefore supplied with the DAMA resource unit allocation for itself and for all other nodes, and each unit can deduce where the RA region begins from the remaining available resource units. The first embodiment uses more transmission messages by the allocating agent, but requires less processing and memory at each node. The second embodiment requires additional processing at the node 112, but relieves the satellite from transmitting multiple messages to multiple recipients. Since each allocation message also includes overhead message content, this reduces the number of resource units required to transmit the allocation itself. The second embodiment also provides resource unit assignment information for all nodes to each individual node, and this information can be used advantageously to further optimize the communication efficiency and resource unit assignment.

The allocation of resource units is then received by the first node 112, as shown in block 306. When the first node 112 receives input data, the data is queued into a DAMA channel buffer for transmission over a DAMA channel. A prediction of the delay that the input data in the DAMA channel buffer will be subjected to is computed and compared to a delay threshold. Based upon this comparison, the input data in the DAMA channel is either transmitted over the DAMA channel to the second node 114, or dequeued from the DAMA channel buffer into a RA channel buffer, as shown in block 310. In one embodiment, the DAMA channel is a first-in-first-out (FIFO) device, and the data is dequeued in FIFO order. That is, the input data that was the first to enter the DAMA queue buffer is the first to be dequeued and placed in the RA channel buffer. Finally, as shown in block 312, the dequeued input data in the RA channel buffer is transmitted via the RA resource units.

Computation of the Resource Metric

In order that the STP might be tracked and used for DAMA bandwidth allocation, a suitable metric must be formed that accurately measures it. An instantaneous bit rate of MPEG-1 source coded video can be viewed as a two component process. The video stream at the group of pictures (GOP) level can be thought of as a sequence of scenes. A scene change occurs when a significant change occurs in the GOP size. The present invention uses some these characteristics to extract statistics of the slow time process (STP) and the fast time process (FTP) in order to derive an appropriate metric for acquiring bandwidth on the DAMA channel. Although described with respect to MPEG-1, this technique applies to other coding techniques as well.

Figure 1:
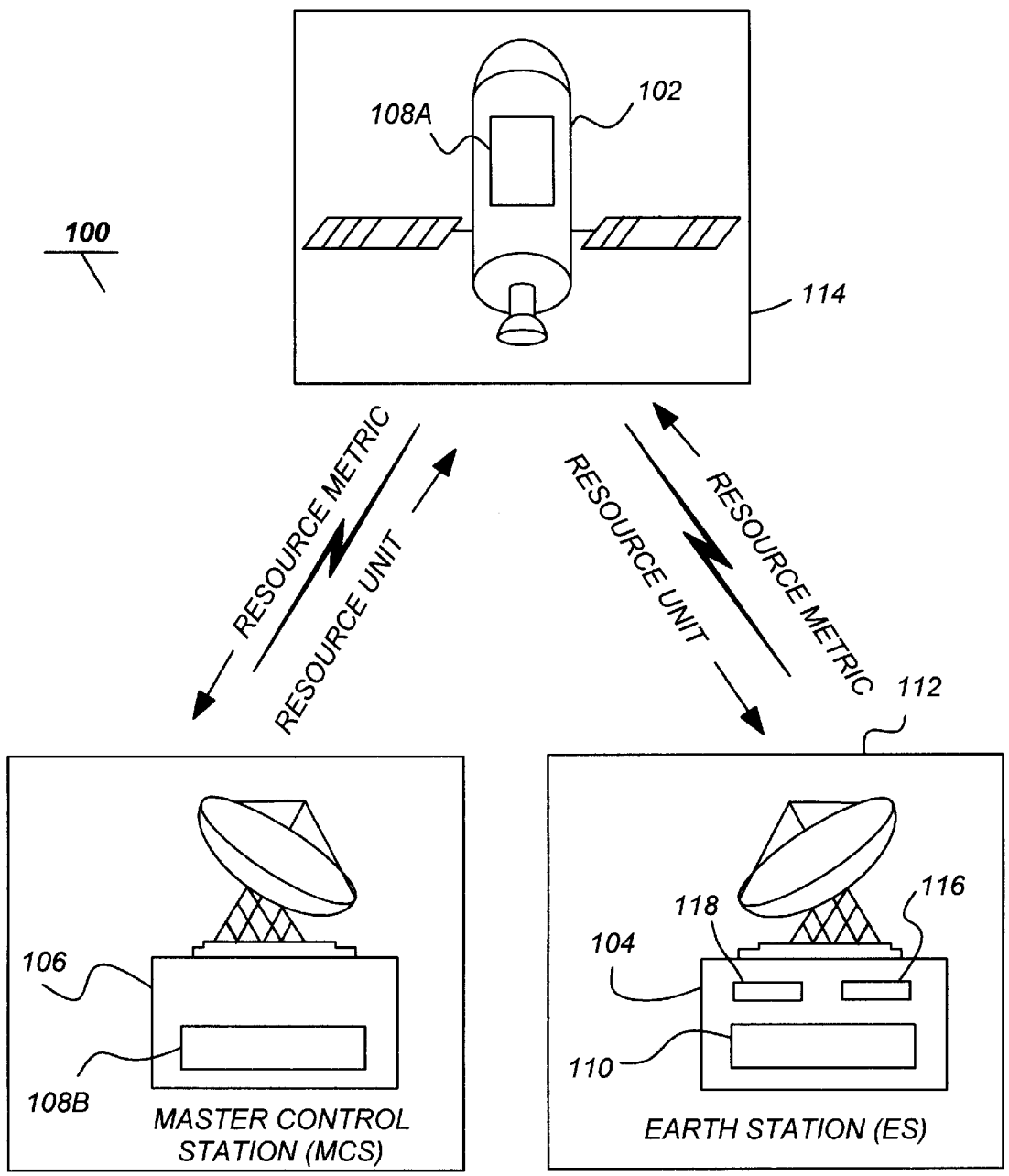
FIG. 1 is a diagram showing the operation of a communication system using a demand assigned multiple access protocol.
Figure 2:
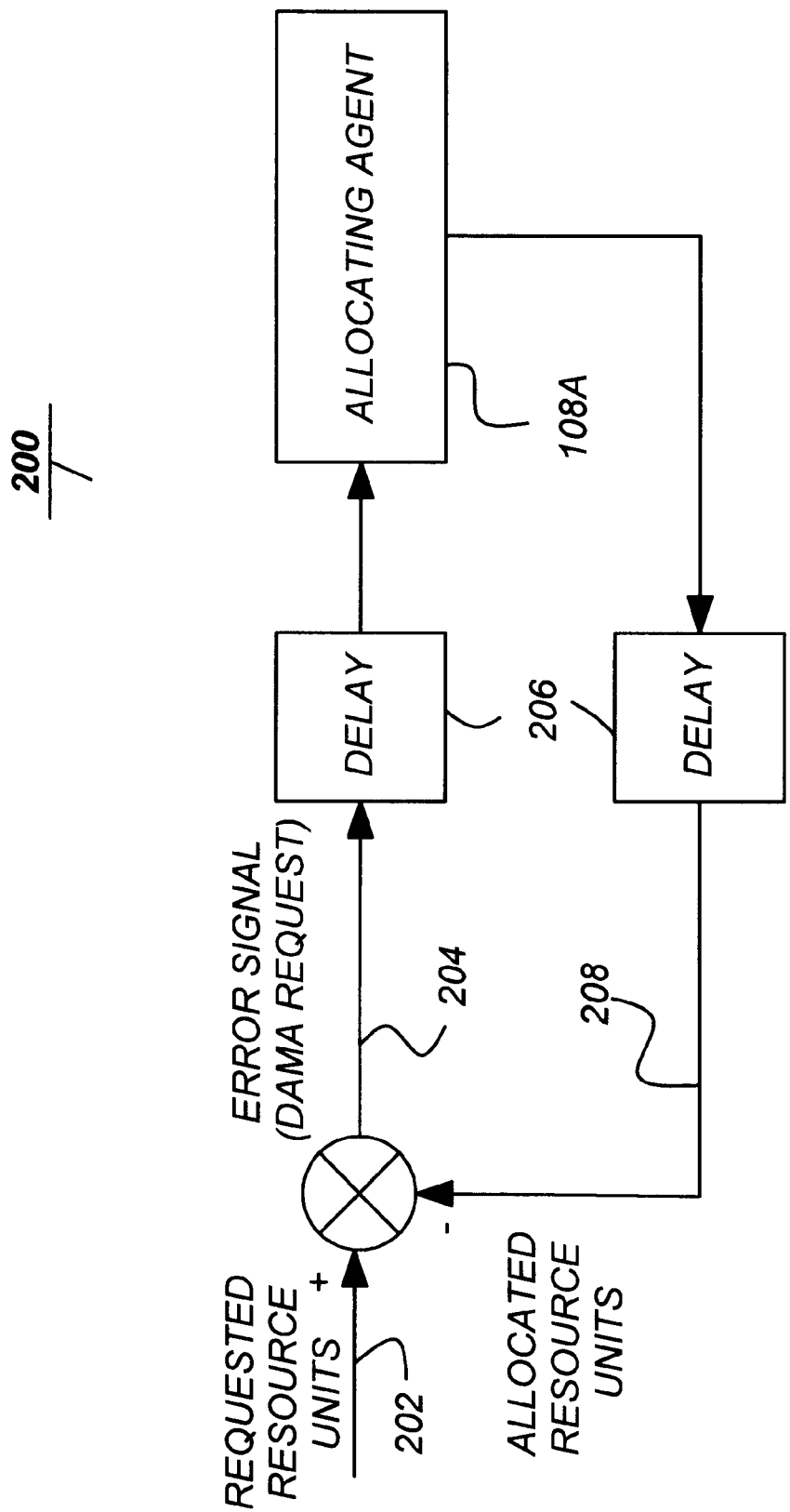
FIG. 2 is a control system 200 that illustrates the demand assigned multiple access protocol.

Video scenes change at a rate that is on the order of seconds, which is considerably greater than the minimum transmission delay (2D). Therefore, considering the control system analogy presented in FIG. 2, a DAMA system can be constructed that allocates bandwidth based upon the STP. Because DAMA signal requests need only be made when the STP changes (indicating higher bandwidth will soon be required) this STP information can also be used to determine when resource requests are transmitted. This allows less frequent transmissions of DAMA signaling requests, leading to a reduction in the amount of bandwidth lost to perform channel control.

Letting $A_i$ be the number of bits received from a source over the period $\{i \cdot T_c, (i+1) \cdot T_c\}$, the following normalized second difference equation can be used to determine when a scene change had occurred:

$$\frac{(A_{i+1} - A_i) - (A_i - A_{i-1})}{\frac{1}{25} \sum_{j=i-24}^{i} A_j} < \gamma \qquad (1)$$

where $$A_j = \int_{\tau=j \cdot T_c}^{(j+1) \cdot T_c} \text{arriving\_bits}(\tau) d\tau \qquad (2)$$

$T_c$ is referred to as the collection window. It is the interval over which the size (in bits) of each arriving video frame is accumulated to form $A_i$. Gamma ($\gamma$) is an arbitrary constant, determined empirically to be $-0.5$.

Figure 4:
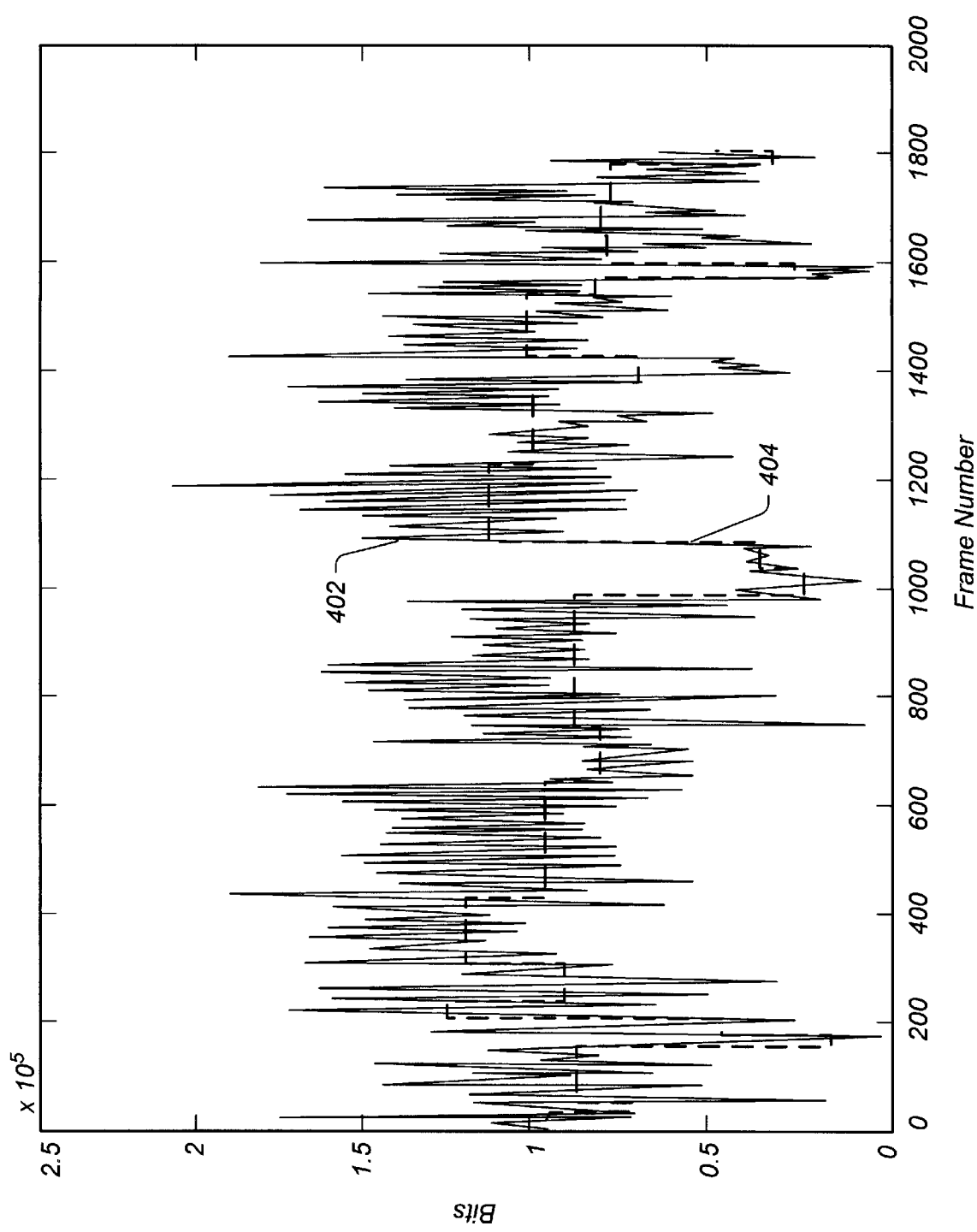
FIG. 4 is a plot showing exemplary data for a scene process and a collected process.

FIG. 4 is a plot showing a scene process, $\{S_i, i \geq 0\}$ and collected process, $A_i$, from an H.261 encoded trace of a news program (herein referred to as NP-HN). The process $S_i$ is generated by taking the average value of $A_i$ between two consecutive points in the point process resulting from Equation (1). The NP-HN trace was produced using the video conferencing tool having three parameters to control the bandwidth and quality: B (bandwidth), F (frame rate), and Q (quality). The trace shown in FIG. 4 was obtained using B=384 kb/s, F=10 frames/s, and Q=10, which yielded reasonable video quality. Collected data $A_i$ is represented by solid line 402 and scene data $S_i$ is indicated by dashed line 404.

In forming an estimate of the STP, there are two competing interests. The estimate should be accurate, however the more accurate the estimate, the more samples are required. The time to generate the estimate is also of great importance. The DAMA bandwidth is apportioned so as to track the slow time average, which changes as the scene changes. If a scene change occurs such that the bit rate increases, an excessively long estimation period will lead to excessive packet delays.

Using this process $A_i$ ($T_c$) the RA/DAMA request metric, or packet flow rate metric (PFRM) which seeks to track the STP, is the scalar $$M(i) = \sum_{j=0}^{w} A_{i-j} h_j \qquad (3)$$

The parameters $A_i$, h, w, and the collection interval $T_c$ can be chosen for each connection based on parameters such as the quality of service (QoS) parameter. This metric is simply an inner product of the process $A_i$ with a vector h of length w. Since this vector is arbitrary, for simplicity the unit step function $u(n)-u(n-w)$ can be chosen, but it can be seen that h may be one of many forms of low-pass or averaging filters. If the vector h is chosen as the step function $u(n)-u(n-w)$, the packet flow metric is a time windowed average of the collected process $A_i$. What remains is to find the proper values for the time window w, and the collection interval $T_c$.

$T_c$ can be chosen empirically. Since $A_i$ is used to find scene changes, it also represents the bit rate at the GOP level. This dictates that $T_c$ be a multiple of the GOP length. The GOP length for the NP-HN trace varies between 2 and 3 (i.e. IP or IPP) thus, for the data shown in FIG. 4, $T_c$ may be set to 300 milliseconds. $T_c$ may also be selected according to the program type according to the frequency of expected scene changes. For example, a sporting event may have substantially fewer scene changes than an action movie. As described above, the collection interval $T_c$ (i.e. the interval between successive resource metric requests) is normally fixed, but can be asynchronously based on the measured information rate as well.

A value for w must be determined as well. Referring back to FIG. 4, we can imagine the process $\epsilon_i = S_i - A_i$ as "noise" riding on top of a low frequency signal $S_i$. Since the goal is to extract the process $S_i$ and use it as the resource metric for DAMA resource unit allocation, then the ability to estimate that process will depend upon the variance of $\epsilon_i$. As with $T_c$, w should be made small enough to make the request metric M(i) respond quickly to scene changes, but long enough such that M(i) tracks the STP. Since there is no known probability density function (PDF) associated with the processes, there is no closed form expression relating the variance of M(i) to the averaging filter length w.

However, the variance of M(i) can be found using Monte Carlo techniques over the entire lengths of the video trace. This was performed for the NP-HN trace of FIG. 4 and for other several MPEG-1 traces. The MPEG sequences all have a GOP size of twelve frames that follow the pattern IBBPBBPBBPBB. The peak and mean bit rates vary from 270–2,710 kb/s and 150–490 kb/s respectively. A frame rate of 25 frames per second and a GOP size of 12 make the collection interval, $T_c$ for the MPEG traces 480 milliseconds. Both the MPEG-1 traces and the NP-HN trace of FIG. 4 fit the definition of what is considered to be medium quality video.

Figure 5:
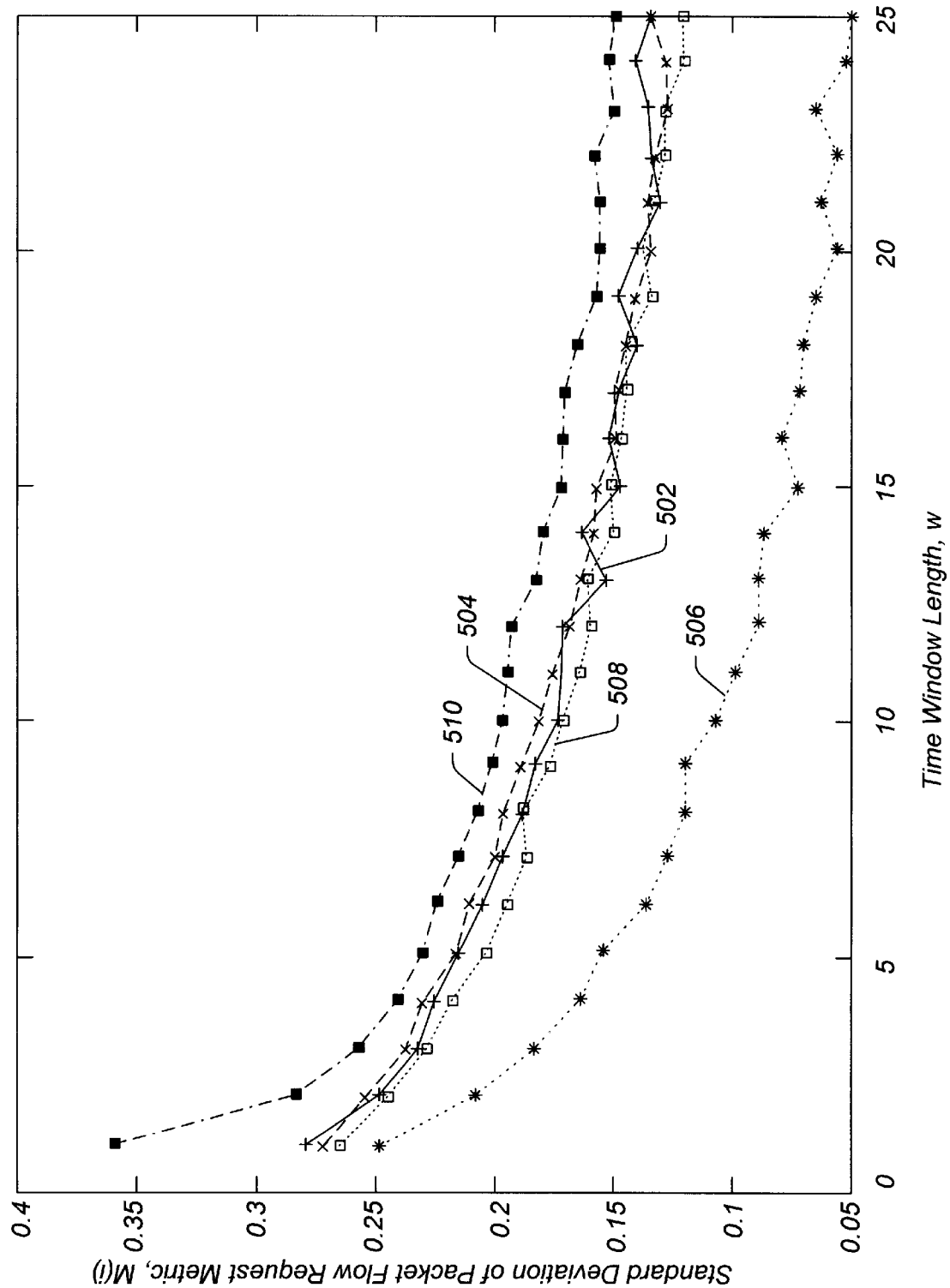
FIG. 5 is a plot showing the standard deviation of a packet flow metric as a function of time window length for selected data types.

FIG. 5 is a plot showing the standard deviation of M(i) as a function of w for a number of data types. Traces 502–508 are MPEG-encoded data, and trace 510 are obtained from the NP-HN trace (which was compressed according to the H.261 video compression standard). The difference in standard deviation between the two coding techniques is due primarily to the means by which the video sequences were encoded. The MPEG sequences have frames in a fixed pattern arriving at fixed intervals of 40 milliseconds. When the NP sequence is encoded, the actual pattern (either IP or IPP) and the inter-frame spacing vary, depending upon the three parameters B, F, and Q. FIG. 5 shows that for both traces the sharpest drop in standard deviation occurs before w=5. For the NP trace w is set equal to 4 and $T_c$ to be the maximum GOP length of 300 milliseconds.

The foregoing technique is used to generate and transmit a resource request having a resource metric from the first node 112 to the allocating agent 108.

Figure 6:
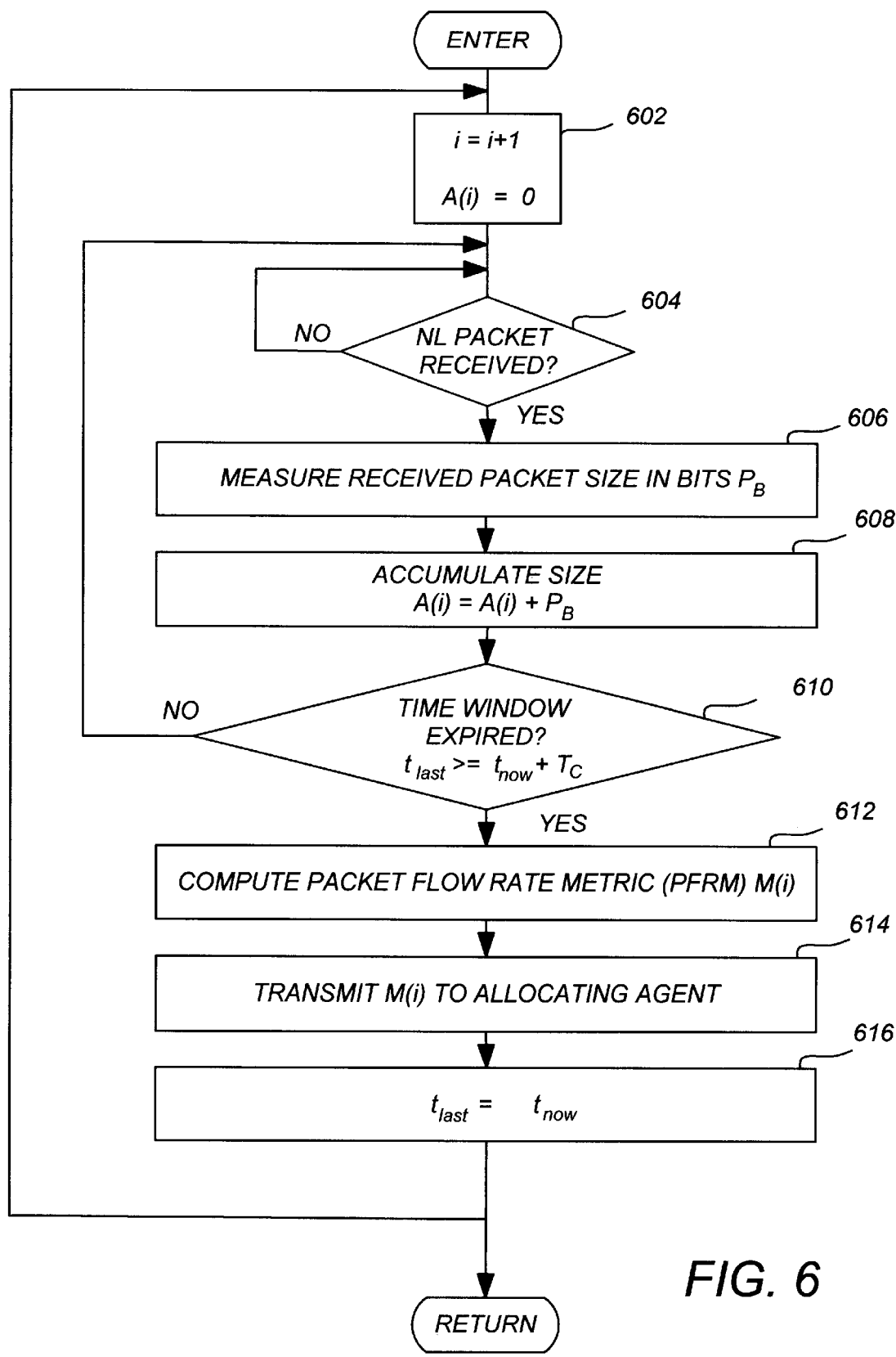
FIG. 6 is a flow chart presenting illustrative process steps used to transmit a resource request from the first node to an allocation agent.

FIG. 6 is a flow chart presenting illustrative process steps used to transmit a resource request from the first node 112 to an allocation agent 108 using the principles described above. Block 602 initializes parameters used in subsequent blocks. Input data is received in the first node 112 in the form of a plurality of data packets. When a network layer packet is received, the size of the received data packet is measured, as shown in block 604 and 606. In communication schemes with constant data packet size, the constant data packet size can be used, and this step eliminated. Then, the measured size of the received data packets is accumulated over time window $T_c$, as shown in block 608, wherein the time window $T_c$ is determined according to the principles described above.

After the time window $T_c$ has expired, the new measured size of the received data packets accumulated over the time window $T_c$ is used to compute the packet flow rate metric (PFRM), or M(i) in accordance with equations (1)–(3). In essence, these equations implement a time-windowed average of the input data determined according to the accumulated measured size of the received data package and the time window $T_c$. This is illustrated in blocks 610–612. It should be appreciated that the time window used to implement the foregoing technique is a sliding window, and hence, the process described above continues using newly arrived input data. The, PFRM M(i) is then transmitted 614 to the allocating agent 108. Block 614 initialized the time reference, and logic returns to block 602 to wait for additional data packets.

In one embodiment of the present invention, the RA/DAMA protocol is implemented in a TDMA scheme at the physical layer of the first node 112 and the second node 114. In this implementation, all time slots are of equal length, and the resource metric is transmitted in a piggybacked manner with the data slots. This relieves the need for the "mini time slots" used in conventional DAMA techniques.

As described earlier in this disclosure, it is possible to compare the time-windowed average of the input data rate to a threshold value (such as $\gamma$ in equation (2)) and to use this comparison to determine if a resource request should be transmitted to the allocating agent 108. In this embodiment, if the time windowed average of the input data rate exceeds the threshold value, a scene change has been detected, and the resource metric is set to the time windowed average of the data rate, and transmitted in the resource request. If the time windowed average of the input data does not exceed the threshold value, a scene change has not been detected, and the process of determining the time-windowed average of input data continues.

Dequeuinz Data from the DAMA Buffer to the RA Buffer

As described above in block 306 of FIG. 3, the allocating agent 108 responds to the resource request by transmitting an allocation of resource units. The allocated resource units comprise both DAMA channel resource units and RA channel resource units.

The partitioning between the DAMA and RA channels by the allocation agent 108 proceeds as follows. The DAMA channel is the first L slots where N is the number of slots per TDMA time frame and where:

$$L = \sum_{j=1}^{N_{ET}} B^j(i) \qquad (4)$$

and where $N_{ET}$=the number of first nodes 112 such as earth stations 104 and $B_j(i)$=the amount of bandwidth or resource units allocated to terminal j during the $i^{th}$ frame.

The RA channel is then defined as the N–L slots that remain in the current TDMA frame. This logical partition creates a TDMA physical access method where the boundary point between the RA and DAMA region changes.

Figure 7:
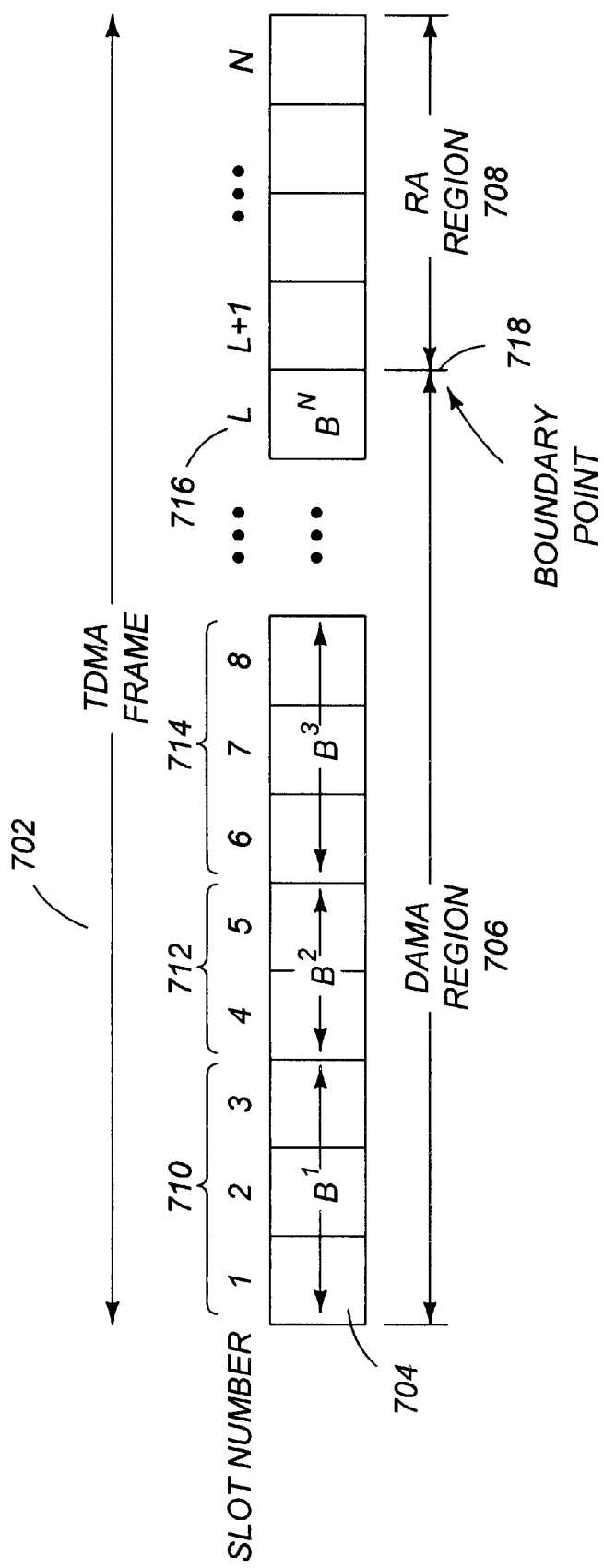
FIG. 7 is a diagram showing an RA/DAMA partitioned channel for a TDMA frame.

FIG. 7 is a diagram showing an RA/DAMA partitioned channel for a TDMA frame 702. The TDMA frame 702 comprises a DAMA region 706 and a RA region 708, each shown with a plurality of time slots 704. Slots 1–L are allocated to DAMA channel transmissions, while slots L+1 through N are allocated to RA channel transmissions. Since the PFRM M(i), derived as described above is used to determine DAMA bandwidth acquisition, M(i) must be transmitted to the allocating agent every collection interval, $T_c$. This imposes the restriction that $T_c \sim m \cdot T_f$ where m is an integer, and $T_f$ is the length of a TDMA frame. This means that the length of a superframe, $T_{sf}=m \cdot T_f$, must be close to the collection interval for the metric to work efficiently. The exact location of the boundary between DAMA slots and RA slots is communicated to each node 112 or earth station 104 every superframe by the allocating agent 108.

In the embodiment shown in FIG. 7, allocated resource units are broadcast to all nodes in a single message in a TDMA frame 702 including an allocation of slots 710 to one node (slots 1–3), an allocation of slots 712 to a second node (slots 4–5) an allocation of slots to a third node (slots 6–8), and an allocation of an $L^{th}$ slot to an $L^{th}$ node 716. Boundary point 718 defines the beginning of the RA region 708, which includes slots L+1 through N.

Figure 8:
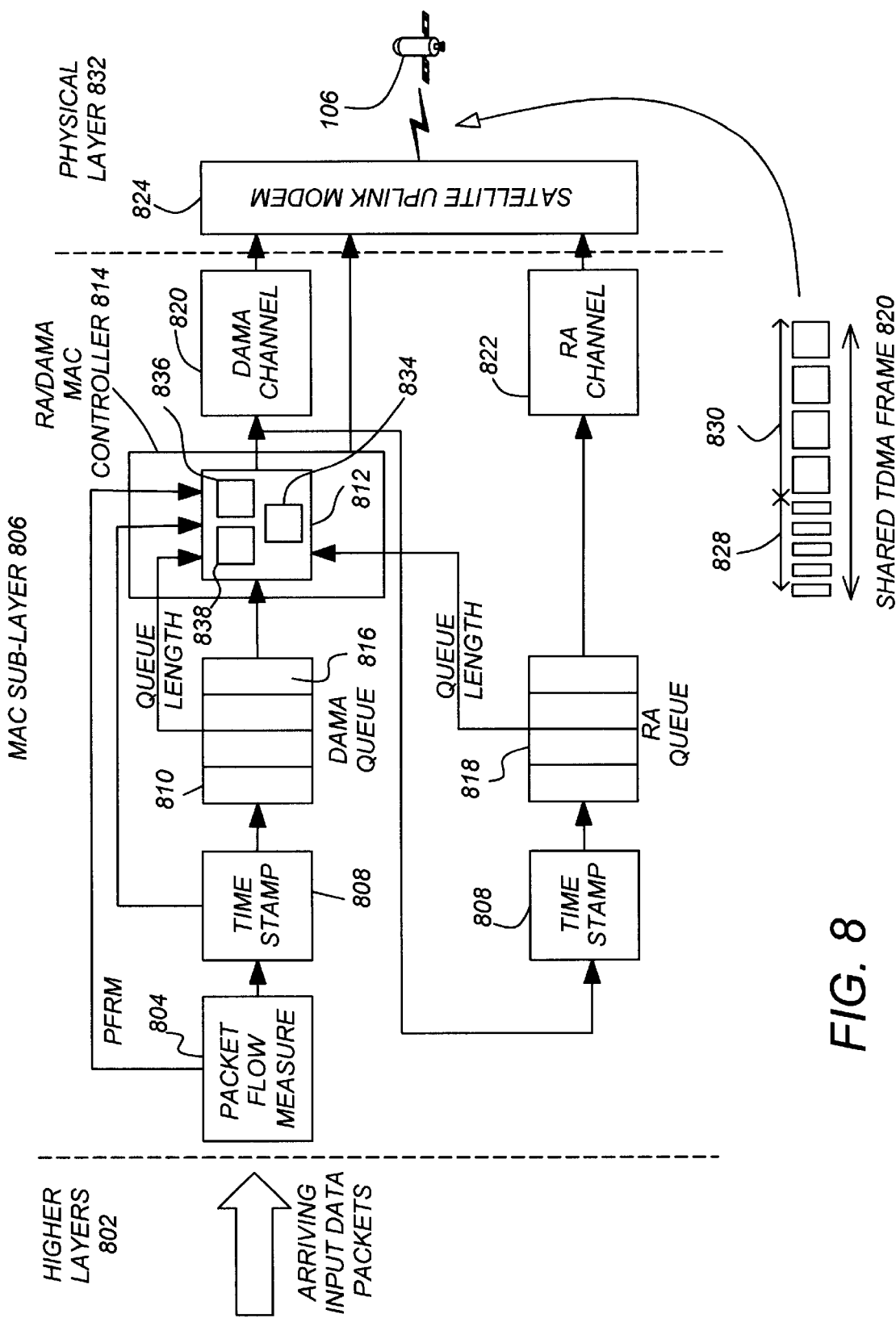
FIG. 8 is a block diagram of a first node such as an earth station employing a technique of dequeuing data from the DAMA queue to the RA queue.

FIG. 8 shows block diagram of a first node 112 such as an earth station 104 employing the technique of dequeuing data from the DAMA queue to the RA queue. A packet flow measurement module 804 processes all input data packets arriving at the MAC sublayer 806 from higher layers 802 to determine the PFRM. Input data is also time stamped by the time stamp module 808, and entered into the DAMA queue in the DAMA channel buffer 810. Using the PFRM, the time stamp, and the DAMA queue length, a channel selection module 812 implementing a channel selection algorithm in the RA/DAMA MAC controller 814 determines whether the data at the head of the DAMA queue 816 should be dequeued and placed in the RA queue of the RA channel buffer 818. This determination is made by comparing a DAMA channel delay (DD), a RA channel delay (RD), and a delay threshold value, which is constantly maintained at the earth station 104. When indicated by a comparison between the packets in the DAMA queue, those in the RA queue, and the threshold, packets are dequeued from the head of the DAMA queue and placed into the RA queue.

Input data that is determined to be dequeued and entered into the RA queue in the RA channel buffer 818, is again time stamped by the time stamp module 808, and queued into the RA channel buffer 818. The remaining data queued in the DAMA channel buffer 810 and the input data queued in the RA channel buffer 818 is then transmitted over the DAMA channel 820 and the RA channel 822 via the satellite uplink modem 824 to the satellite 102 in a shared TDMA uplink frame 826 having a signaling phase 828 and a data phase 830. The exact starting points of DAMA and RA data vary from frame 826 to frame 826 based upon demand.

By allowing terminals to transmit packets in a random access manner, the foregoing introduces the possibility of packet loss. For some applications, (i.e. computer data) this is unacceptable, but for many real time applications, this light packet loss is tolerable, and in fact, superior to the video quality currently provided to real time applications by the Internet MBone. Hence, employing the foregoing hybrid RA/DAMA technique provides delay improvements over DAMA and FBA/DAMA and a substantial link utilization increase over FBA.

The channel selection module 812 comprises a DAMA channel delay estimator 834, a RA channel delay estimator 836, and a channel selection or dequeuing module 838, which implement a channel selection algorithm selecting the logical channel (DAMA or RA) to be used to transmit the packet from the earth station 104 to the satellite 102. All packets arriving from the upper layers are time stamped by the time stamp module 808 and placed in the DAMA queue (DQ) implemented by the DAMA channel buffer 810. These packets are considered network layer (NL) packets. When packets are transmitted over the TDMA channel, they are considered physical layer (PHY) packets. If the length of the NL packets is greater than the length of the PHY packets, then fragmentation will occur at the physical layer 832. The channel selection module 810 uses the PFRM from the packet flow measurement module 804 and the size of the DAMA queue (DQ) in the DAMA channel buffer 810 and the random access queue (RAQ) in the RA channel buffer 818 to form delay estimates of the last packet in each queue. If it appears, using these delay estimates, that the packets in the DQ will see delays in excess of a threshold, data packets are removed from the front of the DQ and placed in the random access queue (RAQ). When packets are moved from the DQ to the RAQ, they are dequeued as NL packets.

The foregoing allows all fragments of a NL packet to be transmitted over the same logical channel, thus reducing packet loss rates and simplifying the de-fragmentation process.

FIG. 9 is a diagram showing a pseudo code for implementing the foregoing operations. In the pseudo code: $d_{max}^{DAMA}$ is the delay estimate of the last packet in the DAMA queue (also referred to as the DAMA channel delay (DD)), $d_{maxRA}$ is the delay estimate for the last packet in the RA queue (also referred to as the RA channel delay (RA)), and $D_T$ is the delay threshold. This algorithm seeks to limit the end-to-end delays to below a delay threshold $D_T$. The value $D_T$ is an adjustable parameter. Since there is also a constraint that $d_{max}^{RA} < d_{max}^{DAMA}$, there is no guarantee that packets will never experience a delay in excess of $D_T$. This algorithm causes DAMA packets to be moved from the DQ to the RAQ until either $d_{max}^{DAMA}$ is less than $D_T$ or until $d_{max}^{RA}$ exceeds $d_{max}^{DAMA}$, which balances the delays seen by data packets on each channel.

Generating Packet Delay Estimates

As described above, the channel selection module 812 determines what channel packets will cross based upon the estimated transmission delay. The delay estimate is computed as follows. To accomplish this, a parameter z is defined which defines the round trip delay time into TDMA frames:

$$z = \left\lceil \frac{2D}{T_f} \right\rceil \quad (5)$$

where $\lceil \alpha \rceil$ denotes the smallest integer greater than or equal to $\alpha$, D represents one hop delay from the earth terminal 104 to the satellite 102, and $T_f$ represents the length of a single TDMA frame.

The parameter z represents the amount of time between a DAMA request for resource units (i.e. bandwidth or time slots) and the actual time before the requested resource units will be available. Let i be the number of the current TDMA frame, then $$M\left(\left\lfloor \frac{i}{m} \right\rfloor\right)$$

equals the packet flow metric sent for the superframe containing i, where m is the number of TDMA frames per superframe. M is measured in packets per second, but for purposes of estimating transmission delay, it is converted to PHY packets per frame using the following conversion:

$$M_{packets/frame} = \left\lceil \frac{M_{packets/sec}}{T_f} \right\rceil \quad (6)$$

Let $$B\left(\left\lfloor\frac{i}{m}\right\rfloor\right)$$

equal the DAMA bandwidth, also measured in PHY packets, apportioned to the earth terminal 104 in the $i^{th}$ TDMA frame. If the exact amount of bandwidth requested were to be allocated, $$B\left(\left\lfloor\frac{i}{m}\right\rfloor\right)$$

should be equal to $$M\left(\left\lfloor\frac{i-z}{m}\right\rfloor-1\right).$$

Using these definitions, an estimate of the delay seen by the last packet in the DQ is:

$$d_{max}^{DAMA}(i) = \left\{\sum_{k=0}^{\infty} I_{\{[\sum_{j=0}^{k}\Theta(i,j)]<L(i)\}}\right\} \cdot T_f + 2D + W_{last\_packet}^{DAMA} \quad (7)$$

where $$\Theta(i, j) = B\left(\left\lfloor\frac{i}{m}\right\rfloor\right) \text{ if } j \leq i\mod(m); \quad (8)$$

$$\Theta(i, j) = M\left(\left\lfloor\frac{i+j-z}{m}\right\rfloor-1\right) \text{ if } j \leq i\mod(m);$$

$$\Theta(i, j) = M\left(\left\lfloor\frac{i}{m}\right\rfloor-1\right) \text{ if } j > z.$$

where
L(i) is the length of the PHY packets of the DQ at frame i;
I is the indicator function wherein $I_{TRUE}=1$ and $I_{FALSE}=0$; and
$W_{last\_packet}^{DAMA}$ is the waiting time for the last packet in the DQ.

Essentially, the bracketed terms in equation 7 sum the delays expected in transmitting all of the data packets ahead of the $i^{th}$ data packet in the queue, assuming that each of these data packets will be allocated the resource units (in this case, time slots) that were requested for the data packet. The product of this bracketed value and $T_f$, (which is the time allotted to each frame) yields the time delay expected for data packets that are ahead of the $i^{th}$ packet in the DAMA queue. The factor 2D represents round trip time delay of the message requesting resource units. $W_{last\_packet}^{DAMA}$ accounts for the fact that the calculation performed to estimate the delay time for transmission of the DAMA packet is performed on a periodic basis. Since data packets enter asynchronously, each packet may have to wait for as long as the entire calculation interval before this calculation is performed. For example, if the delay estimate is computed every 20 milliseconds, a data packet entering the DAMA queue 5 milliseconds after the last computation will be delayed an additional 15 milliseconds (the time to the next computation) before it is transmitted.

Equation 7 estimates the delay seen by the last packet in the queue (the most recent data packet to enter the queue) by using the bandwidth allocated in the current superframe, and the requests for bandwidth made in the previous superframes.

Figure 10:
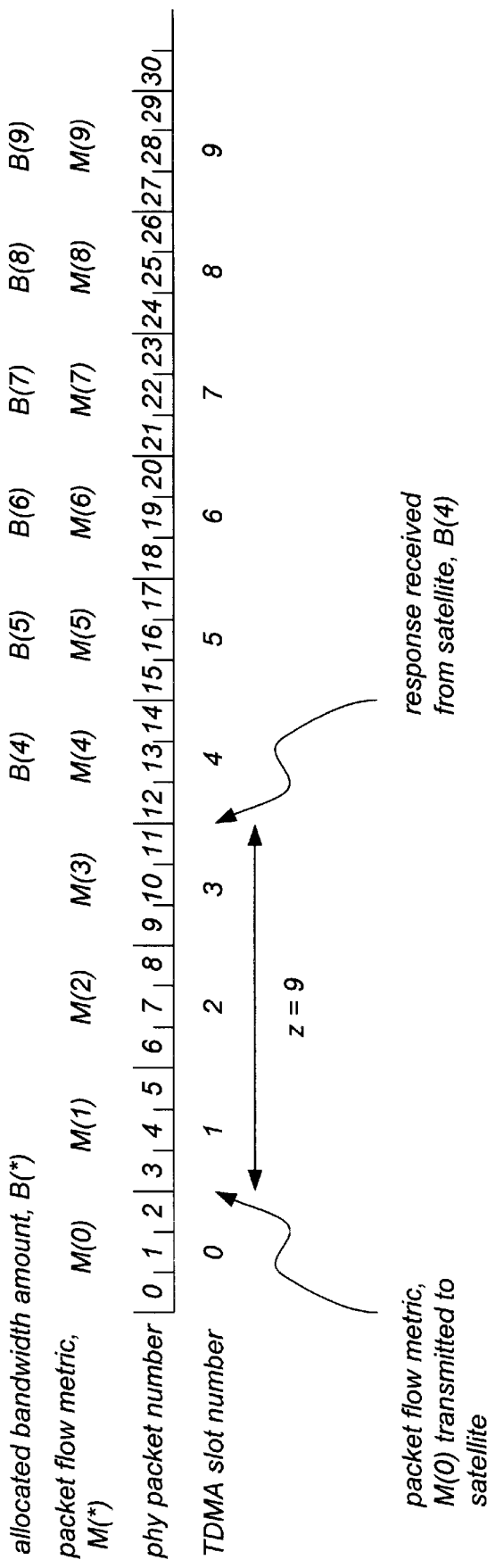
FIG. 10 is a diagram illustrating the estimation of the DAMA transmission delay.

FIG. 10 is a diagram illustrating the estimation of the DAMA transmission delay. It is important to note that $d_{max}^{DAMA}(i)$ is only an estimate because there is no guarantee that $$B\left(\left\lfloor\frac{i}{m}\right\rfloor\right)$$

will equal $$M\left(\left\lfloor\frac{i+j-z}{m}\right\rfloor-1\right).$$

However, for light to moderate network loads, the expected value of $$B\left(\left\lfloor\frac{i}{m}\right\rfloor\right)$$

and $$M\left(\left\lfloor\frac{i+j-z}{m}\right\rfloor-1\right)$$

are such that $$E\left\{B\left(\left\lfloor\frac{i}{m}\right\rfloor\right)\right\} \approx E\left\{M\left(\left\lfloor\frac{i-z}{m}\right\rfloor-1\right)\right\}.$$

The delay estimate for the last packet in the RAQ can be computed as:

$$d_{max}^{RA}(i) = \left\lceil\frac{L^{RA}(i)}{|RA|_{packets}}\right\rceil * T_f + 2D + W_{last\_packet}^{RA} \quad (9)$$

where $L^{RA}(i)$ is the amount of data in the RA channel buffer measured by the length in PHY packets of the RAQ at the $i^{th}$ frame, $|RA|_{packets}$ is the size (in PHY packets) of the RA region in the current TDMA flame, and $W_{last\_packet}^{RA}$ accounts for the fact that the calculation performed to estimate the delay time for transmission of the RA packet is performed on a periodic basis.

Since this technique works on a frame-by-frame basis, the packet inter-arrival process will have a significant impact on the effectiveness of the channel selection algorithm. The channel selection algorithm seeks to adapt to and track the slow time behavior of the video sequence, therefore allowing for some smoothing, or shaping, of the input packet sequence, which may improve performance. This can be accomplished by limiting the maximum flow rate (MFR) of packets arriving to the MAC sub-layer to a preset value.

Packets transmitted across the RA channel are subject to loss due to collisions. Collisions are possible due to the fact that the random access portion of the uplink channel is shared among all the earth terminals 104 in the footprint of the satellite 102. Since there is only coordination among the earth terminals 104 about the allocation in the DAMA region, the only information available to each terminal 104 concerning the RA region is the starting slot. The granularity of a collision is a TDMA slot.

Figure 11:
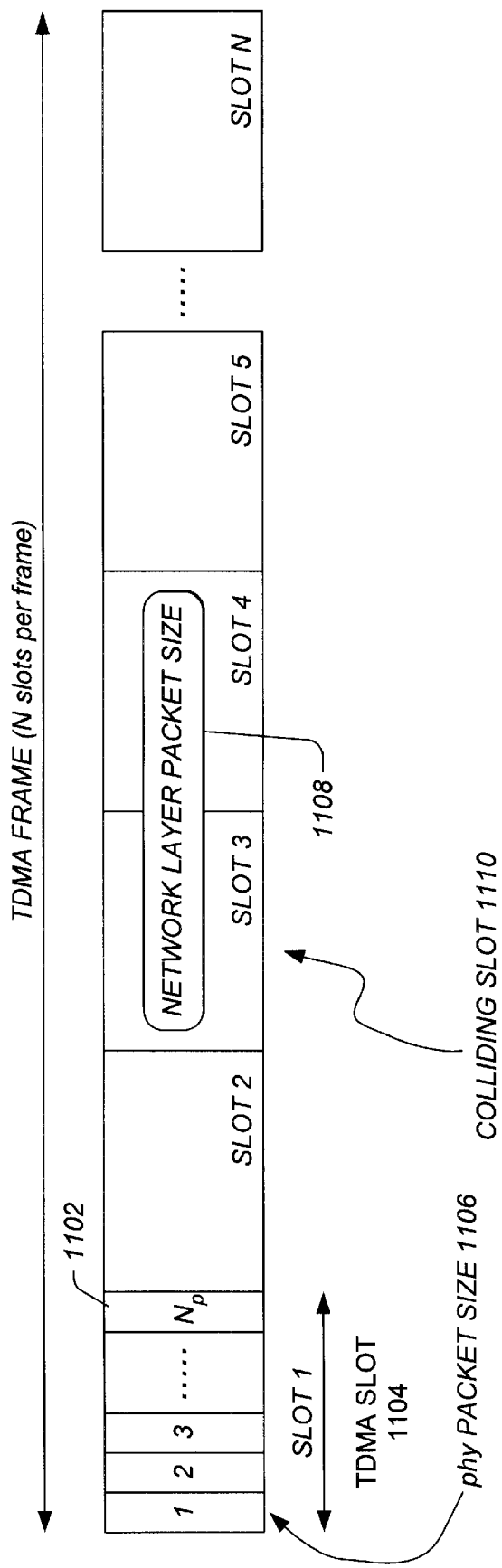
FIG. 11 is a diagram illustrating a collision problem with data transmitted over the RA channel.

FIG. 11 is a diagram illustrating the foregoing collision problem. If there are $N_p$ packets 1102 per TDMA slot 1104 and the one of the slots 1110 experiences a collision, all of the packets the colliding slot 1110 are lost. Compounding this loss is the fact that if only one PHY packet 1106 (which is generally smaller than the TDMA slot 1104 and the network layer packet 1108) is lost, the entire NL packet 1108 is discarded and considered lost.

To mitigate the packet losses seen at the higher layers 802 such as the network layer, a random slot pattern is chosen per NL packet 1108. Since packets are moved from the DQ to RAQ on a NL packet 1108 basis, random transmission patterns will remain unchanged until the entire NL packet 1108 has been transmitted. For light network loads, this amounts to a new slot pattern each TDMA frame 1104, minimizing the effect of possible collisions. At higher loads however, the RA channel could be potentially small, leading to a transmission pattern that would stay constant over multiple frames (until the entire NL packet 1110 has been transmitted).

Conclusion

This concludes the description of the preferred embodiments of the present invention. In summary, the present invention describes a method, apparatus, and article of manufacture for communicating data from a first node to a second node.

The method comprises the steps of receiving input data at the first node, transmitting a resource request having a resource metric from the first node to an allocating agent, receiving an allocation of resource units according to the resource metric, the resource units comprising at least one DAMA channel resource metric and at least one RA channel resource unit, queuing the input data into the DAMA channel buffer, dequeuing input data from the DAMA channel buffer into the RA channel buffer according to a comparison between a predicted transmission delay and a delay threshold, and transmitting the dequeued input data in the RA channel buffer via the RA resource units. The article of manufacture comprises a data storage device tangibly embodying instructions to perform the method steps described above.

The apparatus comprises a receiver for receiving input data, a DAMA channel buffer for accepting the input data, a resource unit request module, operatively coupled to the transmitter and the receiver, the resource unit request module for generating a resource request metric when indicated by an information rate of the input data, and for receiving an allocation of resource units via the receiver, and a channel selection module, for dequeuing input data from the DAMA channel buffer to an RA channel buffer according to a predicted channel delay and a delay threshold.

The foregoing description of the preferred embodiment of the invention has been presented for the purposes of illustration and description. It is not intended to be exhaustive or to limit the invention to the precise form disclosed. Many modifications and variations are possible in light of the above teaching. For example, although the foregoing has been discussed with regard to TDMA techniques, the foregoing may be applied to a system implementing FDMA or CDMA techniques as well. Further, although particular method steps described herein are described as being performed in a particular sequence, it should be noted that these operations may be performed in a different order or concurrently.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of communicating input data from a first node to a second node via a communication link having a plurality of resource units, comprising the steps of:

transmitting a resource request having a resource metric from the first node to an allocating agent;

receiving an allocation of resource units according to the resource metric, the resource units comprising at least one demand assigned multiple access (DAMA) resource unit and at least one random access (RA) resource unit;

queuing the input data into a DAMA channel buffer; and dequeuing the input data from the DAMA channel buffer to an RA channel buffer according to a comparison between a predicted transmission delay and a delay threshold.

2. The method of claim 1, wherein the resource request is transmitted from the first node when indicated by an information rate of the input data.

3. The method of claim 1, wherein the resource request comprises an information rate determined as a time-windowed average of a bit rate of the input data.

4. The method of claim 3, wherein the resource metric is the time-windowed average of the input data.

5. The method of claim 3, wherein the input data is received at the first node in data packets and the time windowed average of the input data rate is computed by performing the steps of:

measuring a size of received data packet;

accumulate the measured size of the received data packets for a time window $T_c$; and determining time-windowed average of the input data according to the accumulated measured size of the received data packets and the time window $T_c$.

6. The method of claim 1, wherein:

the communication link is a TDMA communication link and the DAMA resource units and the RA resource units are time slots; and the input data is dequeued from the DAMA buffer to the RA buffer in a first-in-first out order.

7. The method of claim 1, wherein the step of dequeuing the input data from the DAMA channel buffer to an RA channel buffer comprises the steps of:

computing a DAMA channel delay (DD);

computing a RA channel delay (RD); and dequeuing the input data from the DAMA channel buffer to the RA channel buffer if the DAMA channel delay is greater than the delay threshold and the RA channel delay is less than the DAMA channel delay.

8. The method of claim 7, wherein the step of computing a DAMA channel delay (DD) comprises the steps of:

determining a length of the input data queued into the DAMA channel buffer; and estimating the transmission delay for the input data most recently queued in the DAMA channel buffer from an estimate of the communication link resource units available to the first node and a length of the input data queued in the DAMA channel buffer.

9. The method of claim 7, wherein the input data comprises a plurality of data packets including a most recent queued data packet and at least one less recent queued data packet, and the step of computing a DAMA channel delay comprises the step of estimating the transmission delay for the most recent queued data packet in the DAMA channel buffer from a sum of the expected time delays for each of the less recent queued data packets in the DAMA channel buffer.

10. The method of claim 7, wherein the step of determining the RA channel delay (RD) comprises the steps of:
   determining an amount of the input data in the RA channel buffer; and
   determining the RA channel delay (RD) from the amount of the input data in the RA channel buffer and the capacity of the RA channel buffer.

11. An apparatus for communicating input data to a second node via a communication link having a plurality of resource units, comprising:
   a receiver for receiving the input data;
   a demand assigned multiple access (DAMA) channel buffer for accepting the input data;
   resource unit request module, operatively coupled to a transmitter and the receiver, the resource unit request module for generating a resource request metric and for receiving an allocation of resource units via the receiver; and
   a channel selection module, for dequeuing the input data from the DAMA channel buffer to a random access (RA) channel buffer according to a comparison between a predicted channel delay and a delay threshold.

12. The apparatus of claim 11, wherein the resource unit request module comprises a flow measure module for computing the information rate of the input data as a time-windowed average of the input data.

13. The apparatus of claim 11, wherein the channel selection module comprises:
   a DAMA channel delay estimator for generating an estimated DAMA channel delay;
   a RA channel delay estimator for generating an estimated RA channel delay; and
   a dequeuing module for dequeuing input data from the DAMA channel buffer to the RA channel buffer when a DAMA channel delay is greater than a delay threshold and the RA channel delay is less than the DAMA channel delay.

14. An apparatus for communicating inout data from a first node to a second node via a communication link having a plurality of resource units, comprising:
   means for receiving the input data at the first node;
   means for transmitting a resource request having a resource metric from the first node to an allocating agent;
   means for receiving an allocation of resource units according to the resource metric, the resource units comprising at least one demand assigned multiple access (DAMA) resource unit and at least one random access (RA) resource unit;
   means for queuing the input data into a DAMA channel buffer;
   means for dequeuing the input data from the DAMA channel buffer to an RA channel buffer according to a comparison between a predicted transmission delay and a delay threshold; and
   means for transmitting dequeued input data in the RA channel buffer via the RA resource units.

15. The apparatus of claim 14, wherein the resource request is transmitted from the first node when indicated by an information rate of the input data.

16. The apparatus of claim 14, wherein the resource request comprises an information rate determined as a time-windowed average of a bit rate of the input data.

17. The apparatus of claim 16, wherein the resource metric is the time-windowed average of the input data.

18. The apparatus of claim 16, wherein the input data is received at the first node in data packets and the time windowed average of the input data rate is computed by a input data flow measurement module having:
   means for measuring a size of received data packet;
   means for accumulating the measured size of the received data packets for a time window $T_0$; and
   means for determining time-windowed average of the input data according to the accumulated measured size of the received data packets and the time window $T_0$.

19. The apparatus of claim 18, wherein the means for dequeuing the input data from the DAMA channel buffer to an RA channel buffer comprises:
   means for computing a DAMA channel delay (DD);
   means for computing a RA channel delay (RD); and
   means for dequeuing the input data from the DAMA channel buffer to the RA channel buffer if the DAMA channel delay is greater than the delay threshold and the RA channel delay is less than the DAMA channel delay.

20. The apparatus of claim 19, wherein the means for computing a DAMA channel delay (DD) comprises:
   means for determining a length of the input data queued into the DAMA channel buffer; and
   means for estimating the transmission delay for the input data most recently queued in the DAMA channel buffer from an estimate of the communication link resource units available to the first node and a length of the input data queued in the DAMA channel buffer.

21. The apparatus of claim 19, wherein the input data comprises a plurality of data packets including a most recent queued data packet and at least one less recent queued data packet, and the means for computing a DAMA channel delay comprises means for estimating the transmission delay for the most recent queued data packet in the DAMA channel buffer from a sum of the expected time delays for each of the less recent queued data packets in the DAMA channel buffer.

22. The apparatus of claim 19, wherein the means for determining the RA channel delay (RD) comprises:
   means for determining an amount of the input data in the RA channel buffer; and
   means for determining the RA channel delay (RD) from the amount of the input data in the RA channel buffer and the capacity of the RA channel buffer.

23. A program storage device, readable by a computer, tangibly embodying at least one program of instructions executable by the computer to perform method steps for communicating input data from a first node to a second node via a communication link having a plurality of resource units, the method steps comprising the steps of:
   transmitting a resource request having a resource metric from the first node to an allocating agent;
   receiving an allocation of resource units according to the resource metric, the resource units comprising at least one demand assigned multiple access (DAMA) resource unit and at least one random access (RA) resource unit;
   queuing the input data into a DAMA channel buffer; and
   dequeuing the input data from the DAMA channel buffer to an RA channel buffer according to a comparison between a predicted transmission delay and a delay threshold.

* * * * *